Patented June 12, 1923.

1,458,427

UNITED STATES PATENT OFFICE.

WILLIAM T. McGEORGE, OF HONOLULU, TERRITORY OF HAWAII.

METHOD OF TREATING FRUIT JUICES.

No Drawing.   Application filed October 31, 1921.   Serial No. 511,916.

*To all whom it may concern:*

Be it known that I, WILLIAM T. MC-GEORGE, a citizen of the United States, residing at Honolulu, in the Territory of Hawaii, have invented certain new and useful Improvements in Methods of Treating Fruit Juices, of which the following is a specification.

This invention relates to methods of treating fruit juices; and it comprises a method of treating fruit juices, such as those of citrus fruits which on standing develop dark colors and stale flavors wherein such a juice is treated with a limited quantity of fuller's earth (or other form of aluminum silicate) and then passed through a centrifugal separator under such conditions as to remove coarser solids (flock) while still leaving in the liquid the finer suspended or colloid matter and afterwards submitting the cloudy liquid thus produced to ordinary preservative treatments; all as more fully hereinafter set forth and as claimed.

Fruit juices are liquids of complex composition containing in addition to sugars, acids, etc., a wide variety of other constituents; some in solution and others in what is known as the colloid form; as suspensions or pseudo-solutions. To these undissolved colloid constituents, the juices owe much of their properties and value. A fruit juice submitted to drastic filtration or clarification to remove everything but matters absolutely in solution loses much of its flavor and value. These colloid bodies are more or less sensitive to heat; often suffering materially at the temperatures necessary in pasteurization. On the other hand there are certain bodies in the juices, probably of tannin or polyphenolic nature, whose presence is not necessary to good flavor, which are oxidizable or alterable and also militate against the stability of a preserved juice, causing it to darken and assume a stale flavor; this action being apparently facilitated by the presence of iron in solution.

I have found that simple pasteurization, sterilization or the use of preservatives is not sufficient to preserve the natural flavor and color of many fruit juices, particularly the juices of citrus fruits; and that drastic clarification or filtration does not help but hinders. As regards changes by heat in pasteurization I have however found that the addition of a minute quantity of a protective colloid, less than 1 per cent materially increases the resistivity of the natural fruit juice colloids. Pectin, gelatin, gum arabic and other well known protective colloids may be used.

I have found that the oxidizable or alterable constituents of these juices may be removed by agitation with a limited amount of fuller's earth without substantially changing the composition of the juices in any injurious way. Other adsorptive varieties of clay or hydrated aluminum silicate may be used in lieu of the fuller's earth. In the present method I take advantage of this fact. I agitate the juice with a limited amount of fuller's earth and when tannin constituents are taken out of solution, (as shown by test), I pass the mixture of juice and earth through a centrifugal machine. Absorption or adsorption (as the case may be) of tannins generally takes about 15 minutes' agitation. The centrifugal I operate at such speed that while the natural flock of the juice and the fuller's earth, carrying the tannins, etc., are removed the effluent juice leaves the machine in a hazy or cloudy condition. In other words, I leave the natural suspensoid colloids in the juice. While treating the juice with fuller's earth renders the natural colloids of the juice more resistant to the heat of pasteurization an additional protective colloid is generally added; say 0.1 to 1 per cent of gelatin. The addition may be before or after the centrifugal treatment.

The juice thus prepared is bottled in the absence of air, either in an atmosphere of carbon dioxide, in a vacuum or under diminished pressure. It may be pasteurized before or after bottling. In fact any of the well established preserving treatments may be applied after the juice is ready for bottling.

The fuller's earth has two functions in the present invention: that of removing oxidizable and alterable bodies of tannin or phenolic nature and that of aiding the delicate colloids of the juice to better withstand the pasteurization temperatures. The two results may or may not be related. So far as the second function is concerned, a special protective colloid, like gelatin or pectin may be, as stated, used with a like result. But it is usually better to employ both the earth and the protective colloid. Pineapple juice which is not so readily susceptible of darkening, may be treated with a protective colloid alone, such as gelatin, a product being produced thereby which can be sterilized without coagulation or production of flock. But even with pineapple juice it is better to use the fuller's earth. On the other hand orange juice and the juice of other citrus fruits when treated with fuller's earth in the manner described can be sterilized without detriment to the colloids; that is without the addition of a special protective colloid.

By the present process it is possible to bottle fruit juices in such a form that albumins and other coagulable material remain in solution or colloidal suspension, thereby imparting to the juice a greater food value. There is also a better preservation of the vitamins.

In the present process of treating raw fruit juices, only the larger particles of mechanically suspended pulp or flock are removed while the natural colloids are left in the juice. And by the protective action of the fuller's earth or of added protective colloid, or of both, it is possible to pasteurize at a temperature below the coagulating or flocking temperature of the colloid materials of the juice; retaining them in the final product in the physical state in which they are as the material leaves the centrifugal. The present process may be applied to raw natural juices or to those concentrated by freezing. It is particularly applicable to pineapple juice, orange juice, lemon juice, lime juice and grapefruit juice.

What I claim is:—

1. The process of preserving fruit juices which comprises agitating such a juice with hydrated aluminum silicate, removing the silicate and adsorbed matters by centrifugal force applied in such a degree that the effluent remains hazy or cloudy, pasteurizing the effluent juice and bottling.

2. The process of preserving fruit juices which comprises agitating such a juice with hydrated aluminum silicate, removing the silicate and adsorbed matters by centrifugal force applied in such a degree that the effluent remains hazy or cloudy, adding a protective colloid and bottling.

3. In the treatment of fruit juices the process which comprises agitating such a juice with fuller's earth until bodies giving a tannin reaction are removed and applying centrifugal force to the juice in such a degree as to remove the fuller's earth while leaving the juice hazy or cloudy.

4. In the preservation of fruit juices containing natural suspended colloids the process which comprises heating the same to a pasteurizing temperature in the presence of a protective colloid.

In testimony whereof, I have hereunto affixed my signature.

WILLIAM T. McGEORGE.